No. 834,933. PATENTED NOV. 6, 1906.
J. A. PERKINS.
END THRUST RESISTING MEANS FOR BEARINGS.
APPLICATION FILED NOV. 11, 1903.
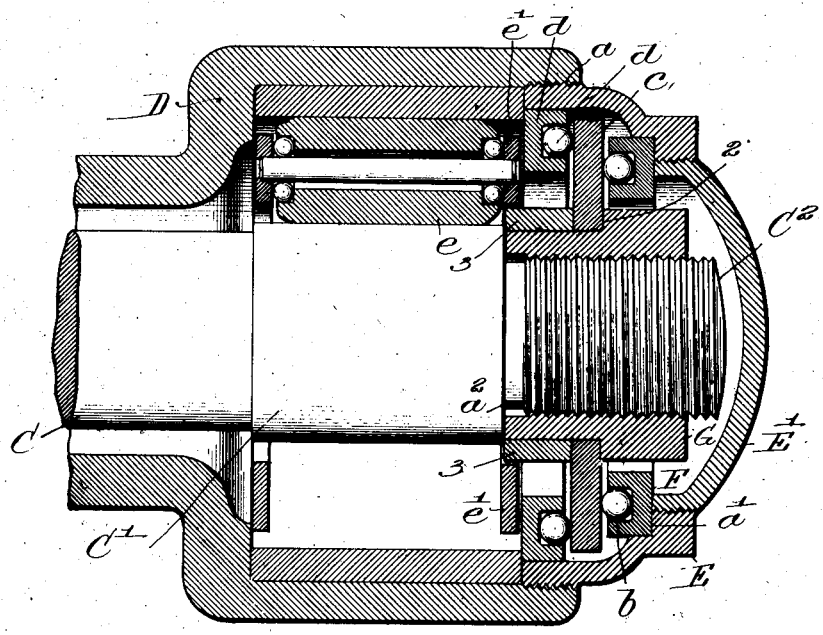

UNITED STATES PATENT OFFICE.

JULIUS A. PERKINS, OF OMAHA, NEBRASKA.

END-THRUST-RESISTING MEANS FOR BEARINGS.

No. 834,933.  Specification of Letters Patent.  Patented Nov. 6, 1906.

Application filed November 11, 1903. Serial No. 180,728.

*To all whom it may concern:*

Be it known that I, JULIUS A. PERKINS, a citizen of the United States, residing at Omaha, in the county of Douglas and State of Nebraska, have invented an Improvement in End-Thrust-Resisting Means for Bearings, of which the following description, in connection with the accompanying drawing, is a specification, like characters on the drawing representing like parts.

This invention has for its object a novel construction of means for resisting end thrust in bearings, especially bearings such as shown in United States Patent No. 713,058, granted November 11, 1902, my invention being also, it will be understood, applicable to any form of bearing wherein it is desired to resist successfully the wear and shock due to end thrust in opposite directions. In the patent referred to a series of balls in a ball-race at one side of an end-thrust ring contacts with a ring-track at the end of the hub or box.

In another application filed concurrently with this application, Serial No. 180,727, I have shown an end-thrust washer interposed between two tracks detached from the axle, said washer having antifriction devices at both sides; but herein I have shown two end-thrust washers having each antifriction means that run in contact with the opposite faces of a track sustained from or through the axle.

The drawing in section shows my invention in one good and practical form incorporated with an axle and hub or box.

The axle C, having an enlargement C', over which may travel usual bearing-rollers e, held in cages e', as provided for in said patent, said axle having a tenon C², and the hub or box D are and may be all as in said patent.

The end of the hub or box has a screw-thread a, with which is engaged a screw-thread of an extension E, having a pocket a', in which is seated an end-thrust washer F, provided at its side nearer the shoulder a² of the axle with antifriction means, shown as a series of balls b in ball-raceways cut in said washer.

The nut G, applied to the tenon C², has a shoulder 2, between which and a ferrule 3, applied to the inner end of nut G, is located a track c, against one side of which the antifriction devices of the washer F contact. The opposite side of the track c is acted upon by antifriction means, shown as balls d in ball-races of an end-thrust washer d', so located at the end of the hub or box and disconnected from the axle as to serve the purpose of a cage-controller against which the end of the traveling cage e', having the bearing-rollers, contacts at intervals, as provided for in United States Patent No. 664,820, granted December 25, 1900, to J. A. Perkins.

The box extension E is closed by a cap E'.

I believe that I am the first to use a hub or box with a track disconnected from the axle and restrained by or through the box from moving longitudinally of the axis of the axle and to employ with said track antifriction means disconnected from the hub or box and sustained by or through the axle, said antifriction means coacting with the opposite sides of said track.

Having described my invention, what I claim, and desire to secure by Letters Patent, is—

1. In a roller-bearing, of the class having bearing-rollers interposed between the box and axle, an axle having a tenon at its end, a track disconnected from the hub or box and surrounding said tenon, two end-thrust washers having each an annular groove antifriction means in each groove, said antifriction means contacting with the opposite sides of said track.

2. In a bearing, an axle having a tenon, a hub or box, a nut on said tenon, and a track sustained by said nut, combined with two end-thrust washers having each an annular groove and sustained by said box, antifriction means received in said grooves and contacting with opposite sides of said track.

3. In a roller-bearing, a hub or box, an axle having a tenon at one end, a nut mounted on said tenon, a track sustained by said nut, and two end-thrust washers each having an annular groove, a series of balls in each of said grooves, said balls contacting with the track sustained by said nut.

4. In a roller-bearing, a hub or box, an axle having a tenon at one end, a nut mounted on said tenon, a track sustained by said nut, and two end-thrust washers each having an annular groove, a set of balls in each of said grooves, said balls contacting with said track at its opposite sides at different distances from the outer edge of the track.

5. In a roller-bearing, an axle having a tenon at its end, a box inclosing said axle, a nut surrounding said tenon, said nut being provided with a ferrule, a track surrounding said nut and held in position thereon between a shoulder of said nut and said ferrule, combined with two end-thrust washers each having an annular groove, said washers being sustained in said box, and a set of balls located in each of said grooves, said balls contacting with the opposite sides of said track.

6. In a bearing, an axle having a tenon, a hub or box, a track and a nut holding said track in position upon the tenon, combined with two end-thrust washers sustained by said box, and antifriction means upon opposite sides of said track contacting therewith and with said washers.

In testimony whereof I have signed my name to this specification in the presence of two subscribing witnesses.

JULIUS A. PERKINS.

Witnesses:
GEO. W. GREGORY,
EDITH M. STODDARD.